United States Patent
Yang

(10) Patent No.: US 8,089,736 B2
(45) Date of Patent: Jan. 3, 2012

(54) DRIVING DEVICE AND PROTECTION METHOD THEREOF

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 438 days.

(21) Appl. No.: 12/409,508

(22) Filed: Mar. 24, 2009

(65) Prior Publication Data

US 2010/0109590 A1 May 6, 2010

(30) Foreign Application Priority Data

Oct. 31, 2008 (CN) .......................... 2008 1 0305356

(51) Int. Cl.
*H01L 41/08* (2006.01)

(52) U.S. Cl. .......... 361/23; 318/432; 318/434; 310/328; 310/323.17

(58) Field of Classification Search .................. 318/432, 318/434; 361/23, 6, 33; 310/323.06, 328, 310/323.01, 323.11, 324, 311
See application file for complete search history.

(56) References Cited

U.S. PATENT DOCUMENTS

| | | | | |
|---|---|---|---|---|
| 3,612,966 A * | 10/1971 | Dybel | ............................ | 361/170 |
| 4,513,342 A * | 4/1985 | Rocha | ............................. | 361/94 |
| 4,629,039 A * | 12/1986 | Imoto et al. | .................. | 188/72.1 |
| 4,854,424 A * | 8/1989 | Yamatoh et al. | ............. | 188/72.1 |
| 5,019,936 A * | 5/1991 | Zylstra et al. | ................. | 361/93.4 |
| 5,869,917 A * | 2/1999 | Ashizawa | ...................... | 310/333 |
| 6,384,514 B1 * | 5/2002 | Slutskiy et al. | ........... | 310/323.17 |
| 6,593,681 B2 * | 7/2003 | Ebisawa et al. | ................ | 310/357 |
| 6,664,710 B1 * | 12/2003 | Gottlieb et al. | ........... | 310/323.02 |
| 6,679,123 B2 * | 1/2004 | Lee | ................................... | 73/769 |
| 6,882,085 B2 * | 4/2005 | Komoda et al. | .......... | 310/323.12 |
| 6,888,288 B2 * | 5/2005 | Seki et al. | ................. | 310/323.16 |
| 7,105,984 B2 * | 9/2006 | Miyazawa | ............... | 310/323.02 |
| 7,296,473 B2 * | 11/2007 | Ishii | ............................. | 73/729.1 |
| 7,342,249 B2 * | 3/2008 | Park et al. | ......................... | 257/59 |
| 7,685,733 B2 * | 3/2010 | Ohmori et al. | ................... | 33/559 |
| 2006/0184154 A1 * | 8/2006 | Moberg et al. | ................ | 604/506 |

* cited by examiner

*Primary Examiner* — Rita Leykin
(74) *Attorney, Agent, or Firm* — Altis Law Group, Inc.

(57) ABSTRACT

A driving device includes a motor, a first rotating portion, a second rotating portion, a piezoelectric assembly, and a controlling unit. The motor includes a rotating shaft. The first rotating portion is fixed to the rotating shaft. The second rotating portion is engaged with the first rotating portion. The piezoelectric assembly is sandwiched between the first rotating portion and the second rotating portion. The controlling unit is electrically connected to the motor and the piezoelectric assembly. The controlling unit is configured for storing a predetermined voltage, and determining whether an electric voltage output by the piezoelectric assembly is greater than or equal to the predetermined voltage and inactivating the motor if the electric voltage output by the piezoelectric assembly is greater than or equal to the predetermined voltage. A protection method for the driving device is also provided.

9 Claims, 7 Drawing Sheets

DRIVING DEVICE AND PROTECTION METHOD THEREOF

BACKGROUND

1. Technical Field

The present disclosure relates to driving technology and, particularly, to a driving device and a protection method thereof.

2. Description of the Related Art

Motors are found in many appliances, such as robots' driving devices. In these appliances, it is not uncommon that the load on these motors suddenly increases in an emergency and goes beyond the power rating of the motors. In these cases, the motors are overloaded while still powered on, which easily damages the motors.

Therefore, what is needed is to provide a driving device and a protection method thereof, in which the above problem is eliminated or at least alleviated.

DETAILED DESCRIPTION OF THE EMBODIMENTS

Figure 1:
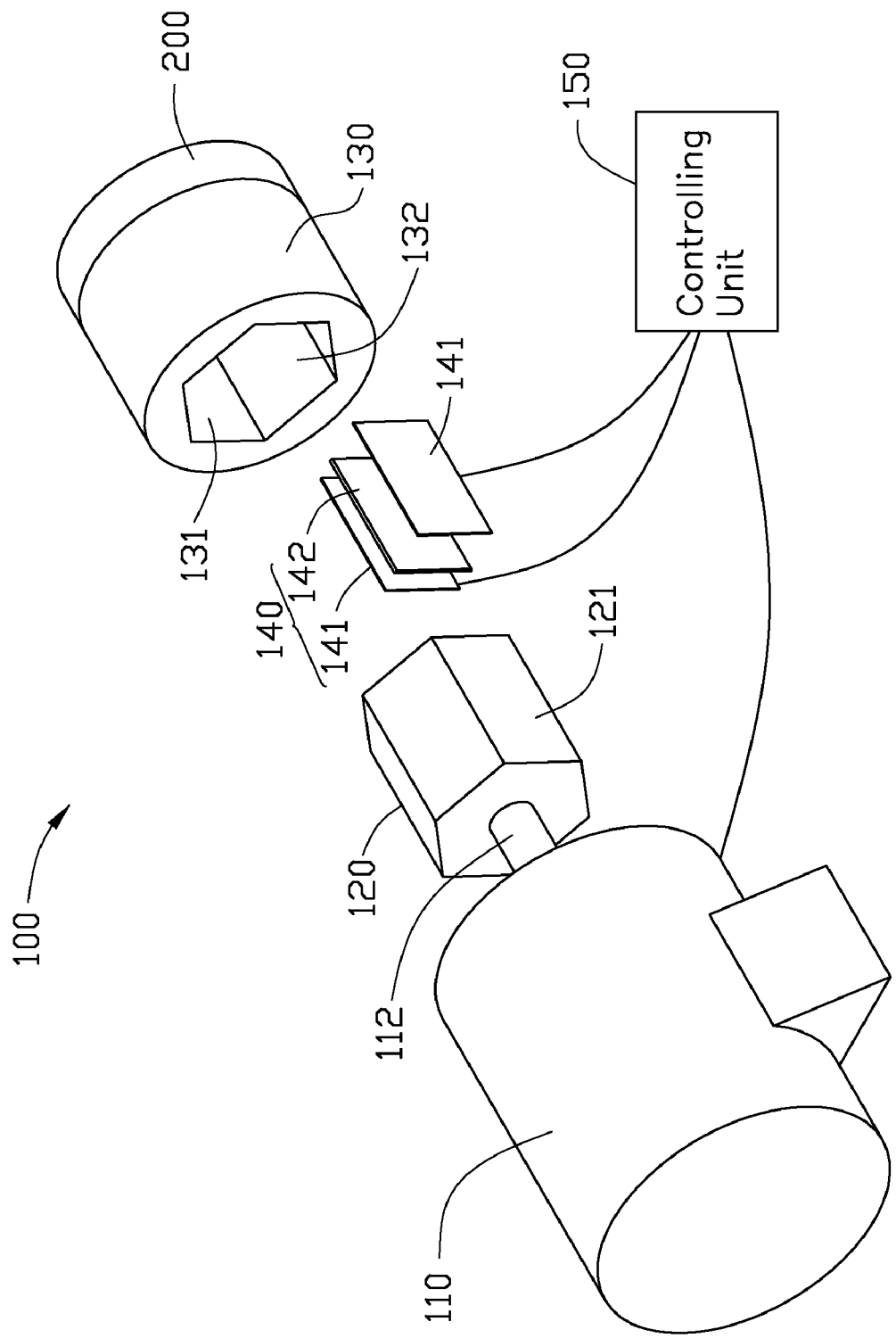
FIG. 1 is a disassembled, isometric and schematic view of a driving device including a controlling unit, according to a first exemplary embodiment.
Figure 2:
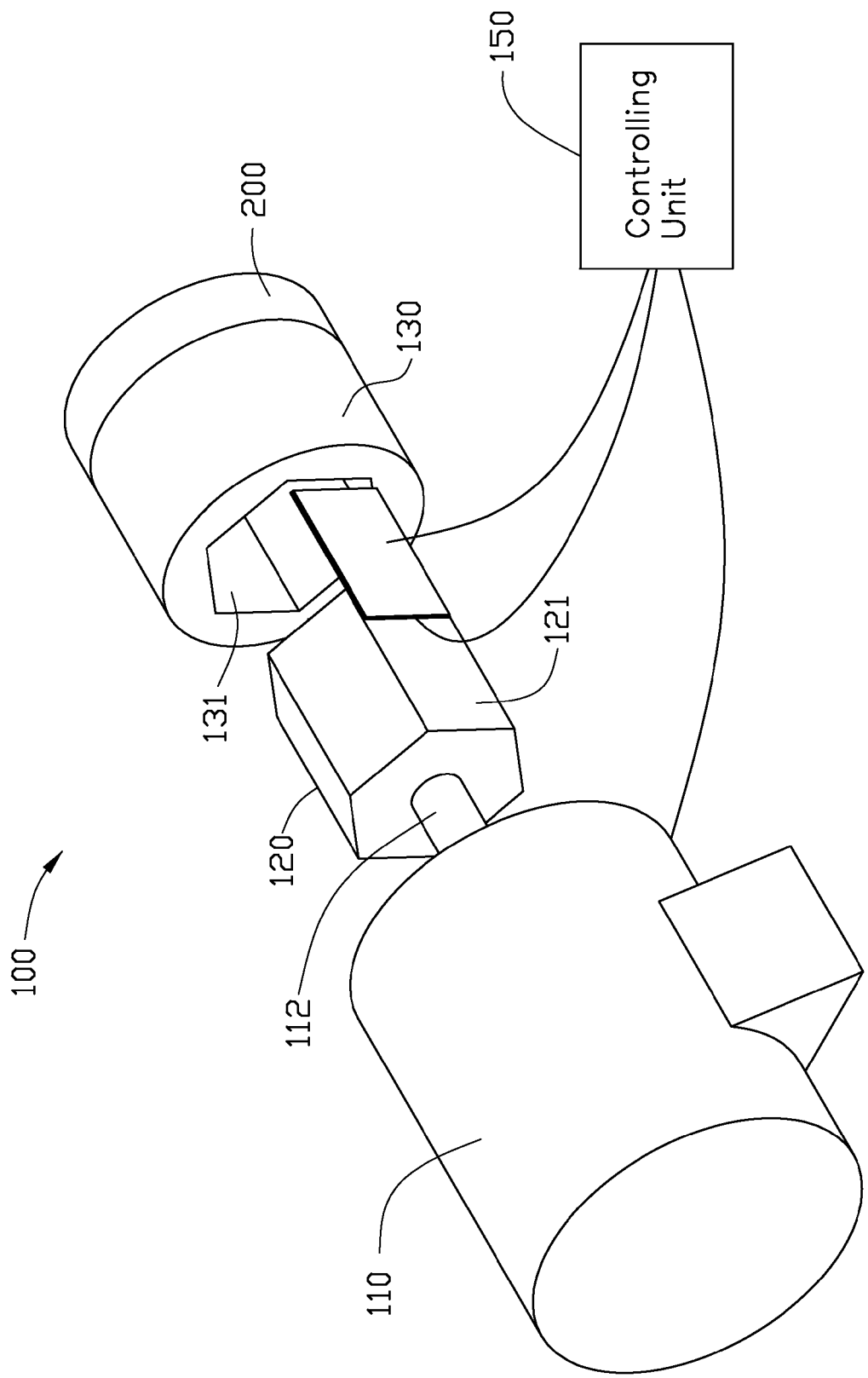
FIG. 2 is a partially assembled, isometric and schematic view of the driving device of FIG. 1.

Referring to FIGS. 1 and 2, a driving device 100, according to a first exemplary embodiment, includes a motor 110, a first rotating portion 120, a second rotating portion 130, a piezoelectric assembly 140, and a controlling unit 150. The motor 110 includes a rotating shaft 112, which rotates when the motor 110 is powered on.

The first rotating portion 120 is non-rotationally fixed to the rotating shaft 112 and is driven to rotate by the rotating shaft 112. In this embodiment, the first rotating portion 120 is approximately uniform-hexagonal-prism-shaped, and includes six outer side surfaces 121.

The second rotating porting 130, being a hollow cylinder, is coupled to a load 200. A receiving cavity 131 is defined in the second rotating portion 130, corresponding to the first rotating portion 120. The receiving cavity 131 is approximately uniform-hexagonal-prism-shaped for matingly receiving the first rotating portion 120 so that the second rotating portion 130 is engaged with the first rotating portion 120 and is driven to rotate by the first rotating portion 120. The receiving cavity 131 is bounded by six inner side surfaces 132 of the second rotating portion 130.

The piezoelectric assembly 140 is sandwiched between one outer side surface 121 of the first rotating portion 120 and a corresponding inner side surface 132 of the second rotating portion 130. The piezoelectric assembly 140 is capable of sensing the torsion force applied to the second rotating portion 130 by the first rotating portion 120 and the piezoelectric assembly 140 is capable of converting the torsion force into an electric voltage. In this embodiment, the piezoelectric assembly 140 includes two electrode plates 141 and a piezoelectric plate 142 sandwiched between the two electrode plates 141. When the second rotating portion 130 is rotated by the first rotating portion 120, the piezoelectric plate 142 is deformed and outputs the electric voltage indicative of the degree of the torsion force via the two electrode plates 141.

Figure 3:
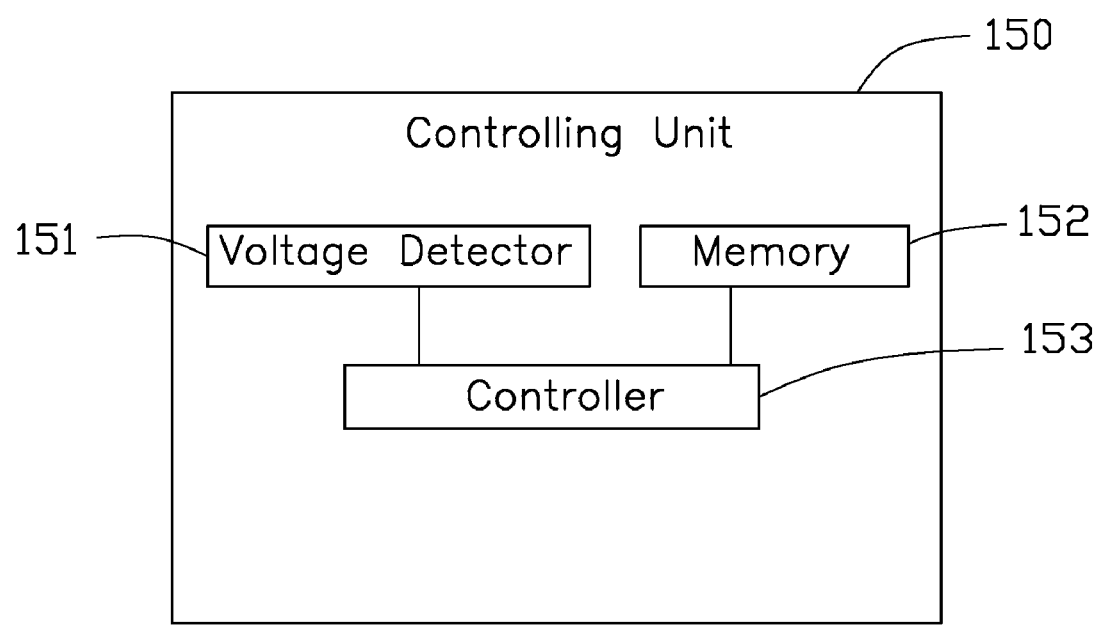
FIG. 3 is a functional block diagram of the controlling unit of FIG. 1.

The controlling unit 150 is electrically connected to the two electrode plates 141 and to the motor 110. Referring to FIG. 3 together with FIG. 2, the controlling unit 150 includes a voltage detector 151, a memory 152, and a controller 153.

The voltage detector 151 is configured for detecting the electric voltage output by the piezoelectric plate 142 through the electrode plates 141. The memory 152 stores a predetermined voltage. The controller 153 is configured for determining whether the detected electric voltage is greater than or equal to the predetermined voltage, and for controlling the motor 110 accordingly. If the detected electric voltage is greater than or equal to the predetermined voltage, the controller 153 inactivates, e.g., powers off, the motor 110 and can reactivate the motor 110 after a predetermined time interval to allow further detection of whether the motor 110 is still overloaded. If the motor is still overloaded, inactivation of the motor 110 is triggered again. The controller 153 will cycle through activation and inactivation of the motor 110 until the motor 110 is not overloaded any more. Then the activation of the motor 110 will be maintained. The predetermined voltage can be determined by the following experiment: initially, the motor 110 is activated by the controller 153 to drive a light load 200 through the first and second rotating portions 120, 130. Then the load 200 is gradually increased until the motor 110 is overloaded (stopped). Upon this condition, the output electric voltage of the piezoelectric assembly 140 is defined as the predetermined voltage.

Figure 4:
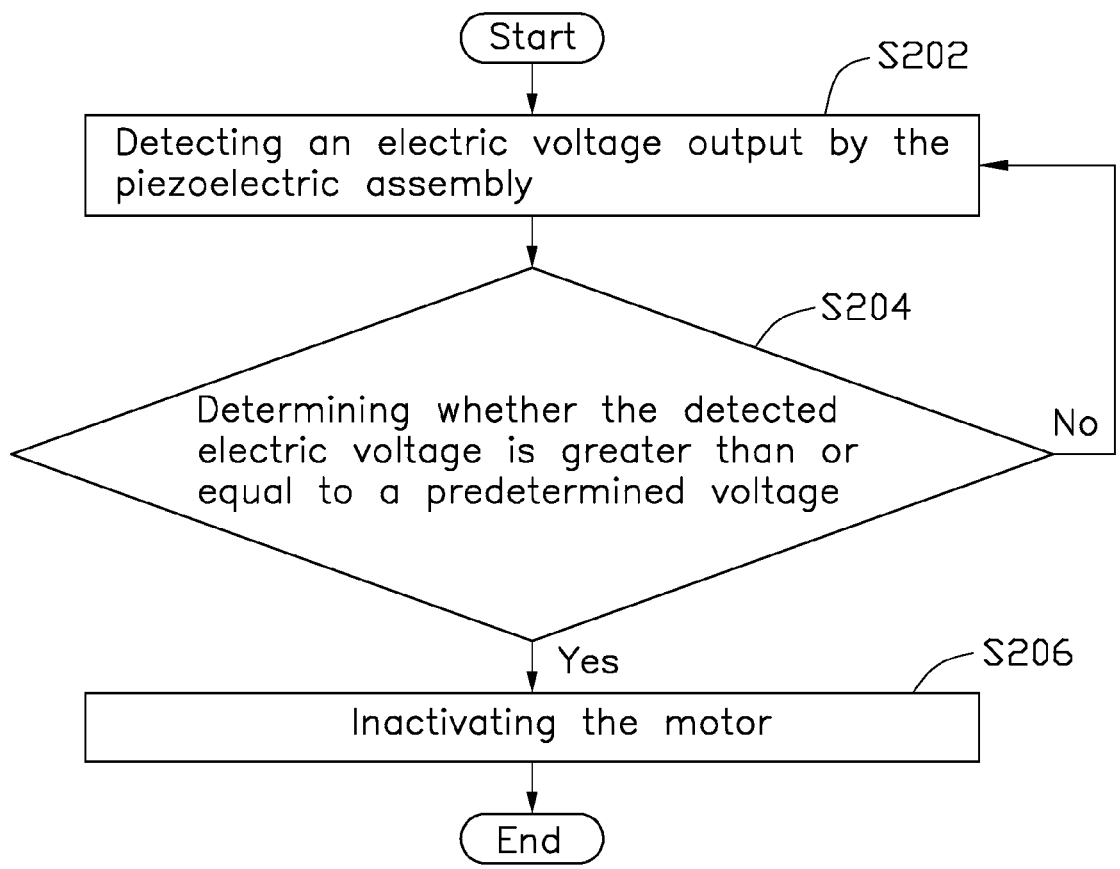
FIG. 4 is a flowchart of a protection method, according to a second exemplary embodiment.

Referring to FIG. 4, a protection method for protecting a motor according to a second exemplary embodiment includes steps S202 through S206. Step S202: detecting an electric voltage output by a piezoelectric assembly. Step S204: determining whether the detected electric voltage is greater than or equal to a predetermined voltage. Step S206: inactivating the motor if yes. If the detected electric voltage is lower than the predetermined voltage, step S202 is repeated. The protection method can be carried out by the driving device 100 of the above embodiment.

In summary, the driving device 100 can idle the motor 110 if the motor 110 is overloaded. Therefore, the driving device 100 can provide protection for the motor 110.

Figure 5:
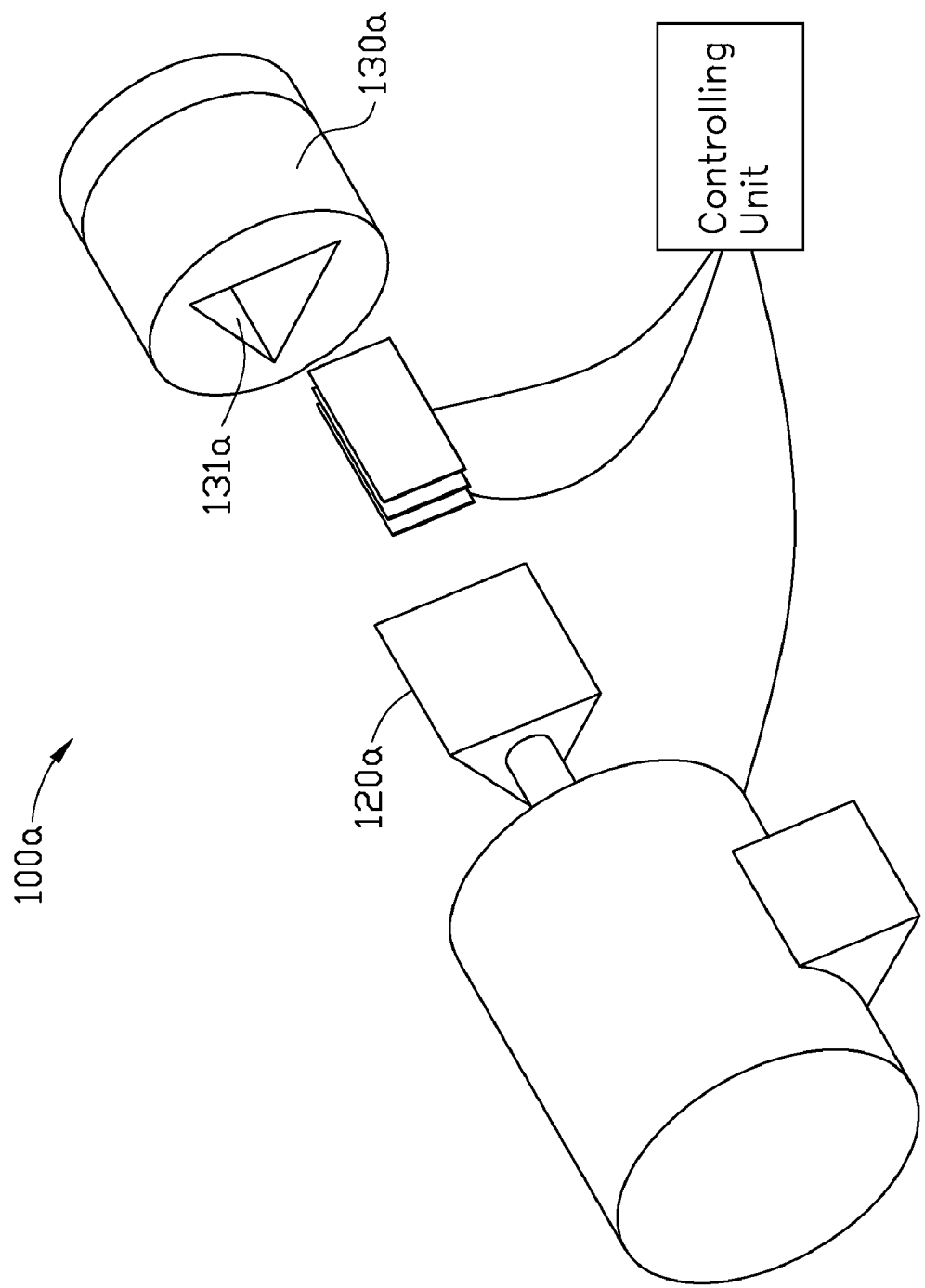
FIG. 5 is a disassembled, isometric and schematic view of a driving device, according to a third exemplary embodiment.

Referring to FIG. 5 together with FIG. 1, a driving device 100a according to a third embodiment is shown. Differences between the driving device 100a of this embodiment and the driving device 100 are that the first rotating portion 120a is approximately uniform-triangular-prism-shaped and the receiving cavity 131a of the second rotating portion 130a is defined approximately uniform-triangular-prism-shaped for fixedly receiving the first rotating portion 120a.

Figure 6:
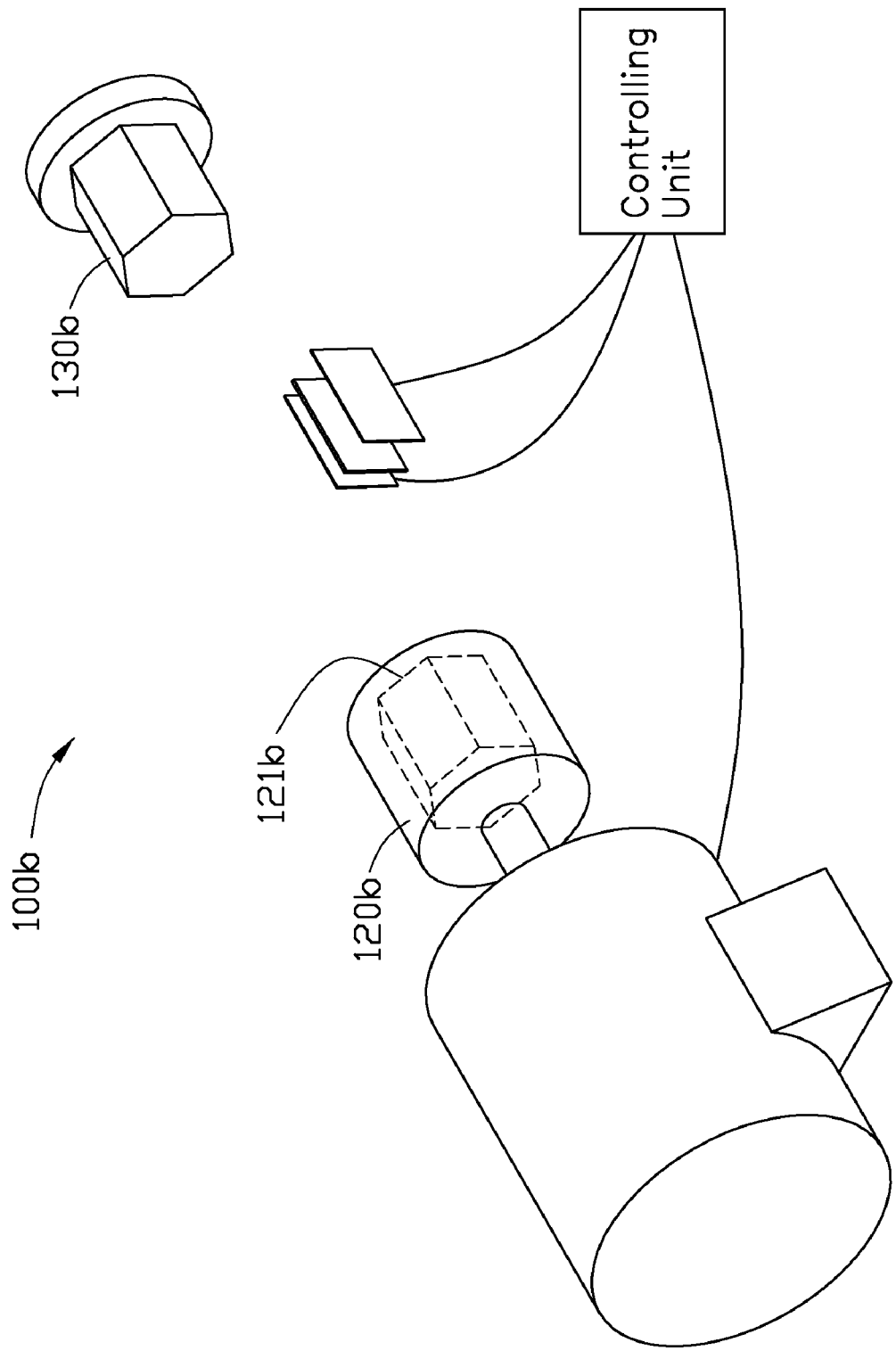
FIG. 6 is a disassembled, isometric and schematic view of a driving device, according to a fourth exemplary embodiment.

Referring to FIG. 6 together with FIG. 1, a driving device 100b according to a fourth embodiment is shown. Differences between the driving device 100b of this embodiment and the driving device 100 are that the second rotating portion 130b is approximately uniform-hexagonal-prism-shaped. The first rotating portion 120b is a hollow cylinder and a receiving cavity 121b is defined approximately uniform-hexagonalprism-shaped in the first rotating portion 120b, corresponding to the second rotating portion 130b, for fixedly receiving the second rotating portion 130b.

Figure 7:
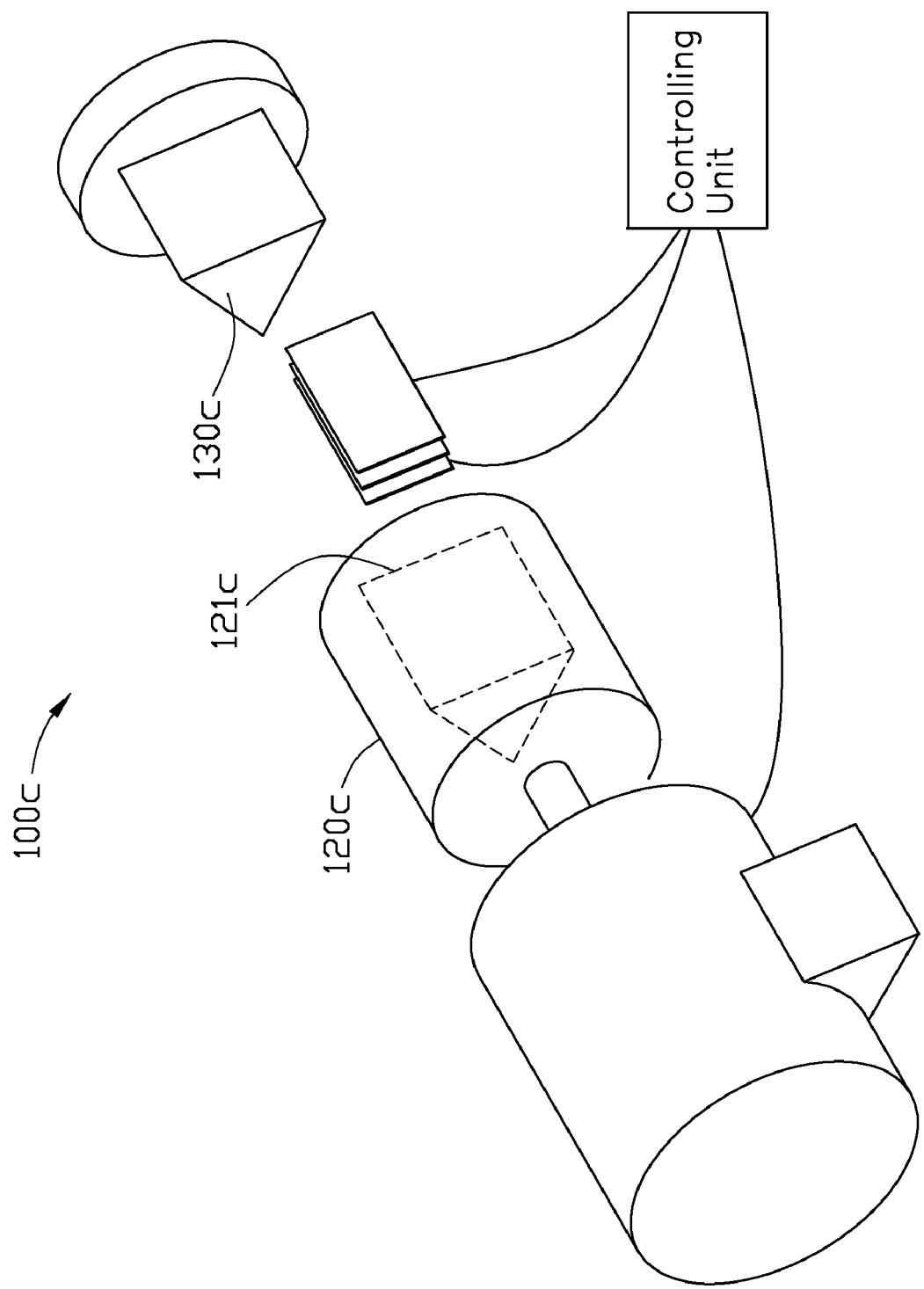
FIG. 7 is a disassembled, isometric and schematic view of a driving device, according to a fifth exemplary embodiment.

Referring to FIG. 7 together FIG. 6, a driving device 100c according to a fifth embodiment is shown. Differences between the driving device 100c of this embodiment and the driving device 100b are that the second rotating portion 130c is approximately uniform-triangular-prism-shaped, and the receiving cavity 121c is defined approximately uniform-triangular-prism-shaped in the first rotating portion 120c for fixedly receiving the second rotating portion 130c.

Advantages of the third, fourth and fifth embodiments are similar to those of the first embodiment.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A driving device comprising:
   a motor comprising a rotating shaft;
   a first rotating portion fixed to the rotating shaft;
   a second rotating portion engaged with the first rotating portion;
   a piezoelectric assembly sandwiched between the first rotating portion and the second rotating portion so that the piezoelectric assembly is capable of sensing the torsion force applied to the second rotating portion by the first rotating portion, the piezoelectric assembly being capable of converting the torsion force into an electric voltage; and
   a controlling unit electrically connected to the motor and the piezoelectric assembly, the controlling unit being configured for storing a predetermined voltage, and for determining whether the electric voltage output by the piezoelectric assembly is greater than or equal to the predetermined voltage and for inactivating the motor if the electric voltage output by the piezoelectric assembly is greater than or equal to the predetermined voltage.

2. The driving device of claim 1, wherein the first rotating portion is approximately uniform-hexagonal-prism-shaped and a receiving cavity is defined in the second rotating portion, corresponding to the first rotating portion; the second rotating portion comprises an inner side surface in the receiving cavity, and the piezoelectric assembly is sandwiched between an outer side surface of the first rotating portion and the inner side surface of the second rotating portion.

3. The driving device of claim 1, wherein the piezoelectric assembly comprises two electrode plates and a piezoelectric plate sandwiched between the two electrode plates.

4. The driving device of claim 1, wherein the first rotating portion is approximately uniform-triangular-prism-shaped, and a receiving cavity is defined in the second rotating portion, corresponding to the first rotating portion; the second rotating portion comprises an inner side surface in the receiving cavity, and the piezoelectric assembly is sandwiched between an outer side surface of the first rotating portion and the inner side surface of the second rotating portion.

5. The driving device of claim 1, wherein the second rotating portion is approximately uniform-hexagonal-prism-shaped, and a receiving cavity is defined in the first rotating portion, corresponding to the second rotating portion; the first rotating portion comprises an inner side surface in the receiving cavity, and the piezoelectric assembly is sandwiched between an outer side surface of the second rotating portion and the inner side surface of the first rotating portion.

6. The driving device of claim 1, wherein the second rotating portion is approximately uniform-triangular-prism-shaped, and a receiving cavity is defined in the first rotating portion, corresponding to the second rotating portion; the first rotating portion comprises an inner side surface in the receiving cavity, and the piezoelectric assembly is sandwiched between an outer side surface of the second rotating portion and the inner side surface of the first rotating portion.

7. The driving device of claim 1, wherein the controlling unit comprises a voltage detector configured for detecting the electric voltage output by the piezoelectric assembly, a memory for storing the predetermined voltage and a controller configured for determining whether the detected electric voltage is greater than or equal to the predetermined voltage and inactivating the motor if the detected electric voltage is greater than or equal to the predetermined voltage.

8. A protection method for a driving device, the driving device comprising a motor comprising a rotating shaft, a first rotating portion fixed to the rotating shaft, a second rotating portion engaged with the first rotating portion and a piezoelectric assembly sandwiched between the first rotating portion and the second rotating portion so that the piezoelectric assembly is capable of sensing the torsion force applied to the second rotating portion by the first rotating portion, the piezoelectric assembly being capable of converting the torsion force into an electric voltage, the method comprising:
   detecting the electric voltage output by the piezoelectric assembly;
   determining whether the detected electric voltage is greater than or equal to a predetermined voltage; and
   inactivating the motor if the detected electric voltage is greater than or equal to the predetermined voltage.

9. The protection method of claim 8, further comprising repeating the step of detecting the electric voltage output by the piezoelectric assembly if the detected electric voltage is lower than the predetermined voltage.

* * * * *